United States Patent
Delio, Jr.

(10) Patent No.: US 7,210,600 B1
(45) Date of Patent: May 1, 2007

(54) SELF CONTAINED SPOON FEEDER

(76) Inventor: John Delio, Jr., 15 Central Ave., Lodi, NJ (US) 07644

( * ) Notice: Subject to any disclaimer, the term of this patent is extended or adjusted under 35 U.S.C. 154(b) by 813 days.

(21) Appl. No.: 10/241,570

(22) Filed: Sep. 12, 2002

Related U.S. Application Data

(60) Provisional application No. 60/331,111, filed on Nov. 8, 2001.

(51) Int. Cl.
  *B65D 35/00* (2006.01)
  *B65D 35/24* (2006.01)
  *B65D 37/00* (2006.01)

(52) U.S. Cl. ............................ 222/92; 222/93; 426/115

(58) Field of Classification Search ................ 426/110, 426/111, 115, 122, 394, 410–411; 30/231, 30/124, 125, 123.6, 128, 123.7, 141, 150, 30/324–328; 222/92–93, 631, 632, 323, 222/282, 101, 192, 103; 206/804, 277
See application file for complete search history.

(56) References Cited

U.S. PATENT DOCUMENTS

| | | | |
|---|---|---|---|
| 1,514,018 A * | 11/1924 | Sharpe ........................ 222/93 |
| 2,550,210 A * | 4/1951 | Vance, Jr. ................... 222/320 |
| 2,589,000 A * | 3/1952 | Vani ............................. 401/55 |
| 3,116,152 A | 12/1963 | Smith | |
| 4,124,316 A * | 11/1978 | O'Rourke ................... 401/184 |
| 4,318,935 A * | 3/1982 | Stussi ......................... 426/576 |
| 4,717,046 A * | 1/1988 | Brogli ........................ 222/107 |
| 4,888,188 A | 12/1989 | Castner, Sr. et al. | |
| 5,038,974 A * | 8/1991 | DaCosta ..................... 222/106 |
| 5,491,895 A | 2/1996 | Lee | |
| 5,975,305 A * | 11/1999 | Barger ........................ 206/572 |
| 6,264,074 B1 | 7/2001 | Emilsson | |
| 6,347,727 B1 * | 2/2002 | Diaz .......................... 222/101 |

* cited by examiner

*Primary Examiner*—Arthur L. Corbin
(74) *Attorney, Agent, or Firm*—Patent & Trademark Services, Inc.; Joseph H. McGlynn

(57) ABSTRACT

A disposable spoon having a hollow main housing with a spoon that is releasably attached to the main housing. When the user places a food packet inside the main housing, the spoon pierces the food packet. A movable extruder actuator is operatively attached to an extruder blade. When the user slides the movable extruder actuator, the extruder blade compresses the food packet causing the contents of the food packet to extruded from the food packet and onto the spoon.

15 Claims, 2 Drawing Sheets

SELF CONTAINED SPOON FEEDER

Applicant claims priority of Provisional application Ser. No. 60/331,111, filed Nov. 8, 2001.

BACKGROUND OF THE INVENTION

This invention relates, in general, to spoons, and, in particular, to an improved, spoon having a self-contained food product within.

DESCRIPTION OF THE PRIOR ART

In the prior art various types of spoons have been proposed. For example, U.S. Pat. No. 5,491,895 to Lee discloses a spoon attached to a hollow, squeezable handle.

U.S. Pat. No. 4,888,188 to Castner, Sr. et al discloses a sealed food package attached to a spoon having a hollow, squeezable handle and a chemical heat pack.

U.S. Pat. No. 6,264,074 to Emilsson discloses a hollow, squeezable handle and a diaphragm covering the spoon.

U.S. Pat. No. 3,116,152 to Smith discloses a one-piece spoon with a hollow, squeezable handle.

SUMMARY OF THE INVENTION

The present invention is directed to a disposable spoon, which is detachably connected to a tube. The tube receives a disposable bag containing food, or the like. When the bag is inserted, a piercing point pierces the bag and a movable extruder moves along the side the bag to push the bag contents onto the spoon.

It is an object of the present invention to provide a new and improved food delivery system.

It is an object of the present invention to provide a new and improved food delivery system wherein the user can selectably insert a food, or the like, into a package.

It is an object of the present invention to provide a new and improved delivery system where the delivery system, the food package, or both may be disposable.

It is an object of the present invention to provide a new and improved delivery system in which the food package is pierced to open the package.

It is an object of the present invention to provide a new and improved delivery system with a movable extruder pushing the food onto the instrument.

It is an object of the present invention to provide a new and improved food delivery system with a movable extruder having notches.

It is an object of the present invention to provide a new and improved food delivery system with a movable extruder having notches for measuring the portion of the product to be dispensed.

It is an object of the present invention to provide a new and improved food delivery system wherein the user can select from a variety of utensils.

These and other objects and advantages of the present invention will be fully apparent from the following description, when taken in connection with the annexed drawings.

DESCRIPTION OF THE PREFERRED EMBODIMENT

Feeding an infant is an extremely complex task, especially when the user is outside the home, since it requires the user to carry several jars of food and at least one clean spoon. The feeding is extremely time consuming and, often times, messy since a user must feed an infant utilizing a conventional spoon and jar. When the user is outside the home, the user must transport a plurality of jars of baby food, adding weight to a bag and taking a considerable amount of space. In addition to multiple jars of food, the user might carry multiple spoons in order to ensure a clean spoon for the infant.

In order to avoid this problem, the present invention is designed to have lightweight food packets, which will take up less space and weigh less than a conventional jar of baby food. Additionally, the present invention is designed so that the feeding instrument is releasably attached to the main housing allowing the user to carry a plurality of feeding instruments.

Figure 1:
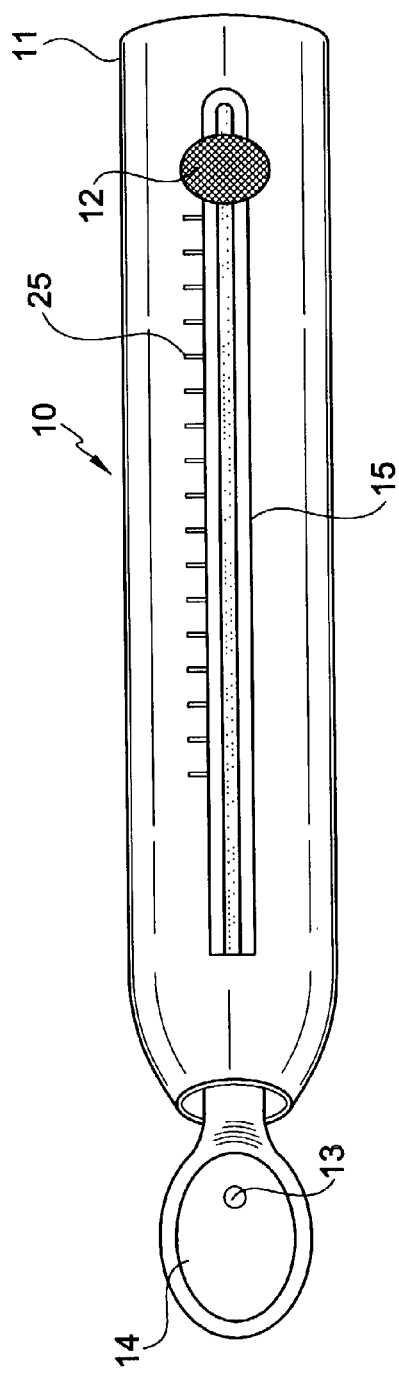
FIG. 1 is a side view of the present invention.

Referring now to the drawings in greater detail, FIG. 1 shows the present invention 10 having a main housing 11, movable extruder 12, spoon food port 13, spoon 14, track 15, and extruder blade 16. It should be noted that the present invention, as shown in FIG. 1, is merely for illustration purposes only and should not be considered the only shape, or form, the present invention could take. For example, the present invention 10 may not have spoon 14, but instead have a fork, knife or straw. The present invention could be virtually any shape and size, and made from any material known within the art.

Spoon 14 is releasably attached to main housing 11 by any means well known within the art. For example, the means could include "male" and "female" connectors allowing a user to attach different types of systems to the main housing 11. For example, the spoon 14 could have a depression 27 which snaps onto a projection 28 on the housing 11 (see FIG. 2). In yet another alternative embodiment, the ends of both spoon 14 and main housing 11 could be threaded. Allowing different systems to be attached to main housing 11 gives the user added flexibility since any feeding means can be used.

The movable extruder actuator 12 is operatively attached to the extruder blade 16. It should be appreciated that the main housing 11 is hollow allowing a food packet to fit inside. After the user places a food packet (see 23 in FIG. 2) inside the main housing 10, the user slides the movable actuator 12 along track 15, which compresses the food packet 23 with the extruder blade 16 as the blade moves along the side of the food packet. As the user slides the movable extruder actuator 12, the extruder blade 16 passes between the outside of the of the food packet 23 and the inside of the housing 11 and compresses the food packet 23, causing its contents to extrude through food port 13 and onto spoon 14.

It should be appreciated that the movable extender actuator 12 slides along track 15 in a one-dimensional plane to the main housing 11, that is, it moves parallel to the longitudinal axis of the housing 11. Since the movable actuator 12 freely slides along track 15, the user determines the amount of the contents of the food packet to be extruded through the food port 13 by sliding the movable actuator 12 along track 15. For example, if the user wishes to have a small amount of the food product emitted from the food port 13, the user will not slide the movable actuator 12 as much.

In an alternative embodiment of the movable actuator 12, there might be notches 25 cut into track 15 which cooperate with structure on the bottom of the extruder actuator 12 in order to indicate the portions that are emitted from food port 13.

Figure 2:
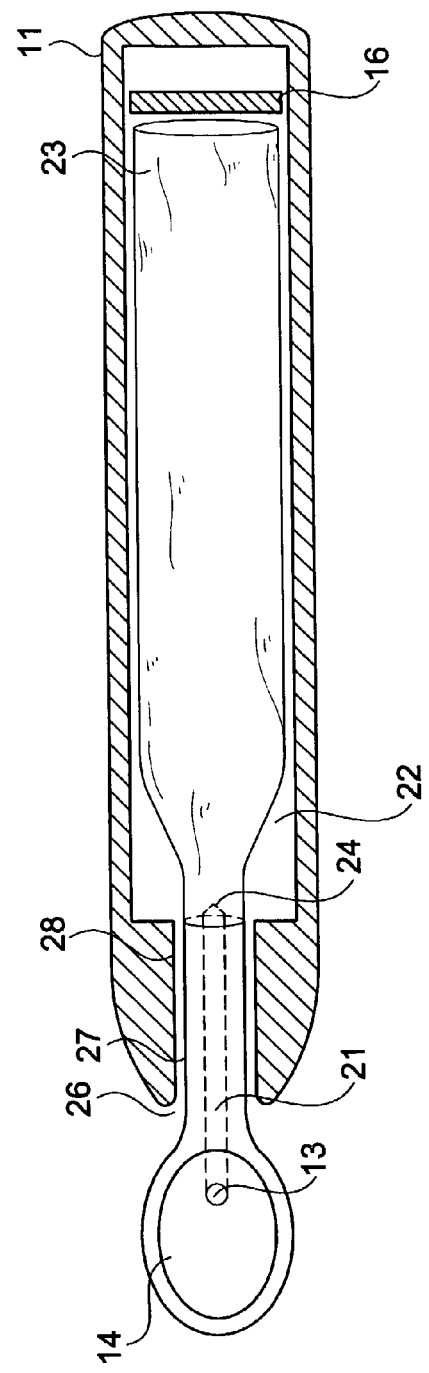
FIG. 2 is an inside view of the present invention.

FIG. 2 is an inside view of the present invention having main housing 11, food port 13, spoon 14, channel 21, bag cavity 22, food packet 23, bag piercer 24, and extruder blade 16. Before the user places the food packet 23 into the present invention, the food packet 23 is sealed. Food packet 23 is made of materials well known within the art, such as a plastic, or the like. Bag piercer 24, is manufactured with spoon 14, and is relatively sharp and hollow. Once the user places the food packet 23 into the bag cavity 22, the food packet 23 is pierced by piercer 24 and the packet is releasably attached to spoon 24. As the food packet 23 is connected to the spoon 14, bag piercer 24 creates a hole in the food packet 23 so its contents can be extruded through channel 21 to spoon 14 when the user slides the movable actuator 12 to the left as shown in FIG. 1.

While the present invention describes that a food packet 23 is inserted into the bag cavity, the packet does not have to contain food. In alternative embodiments, the food packet 23 might contain a liquid or medication. Since the user can choose any means, other than spoon 14, the present invention provides an added flexibility, unlike conventional systems, allowing the user to easily modify the present invention to suit their needs.

It should be appreciated that the present invention 10 is easy to clean, since spoon 14 is releasably attached to the main housing 11. Additionally, a user can carry a plurality of instruments and releasably connect them to the housing if the user's feeding means should change. Also, a user could dispose of the spoon 14 instead of cleaning it.

Figure 3:
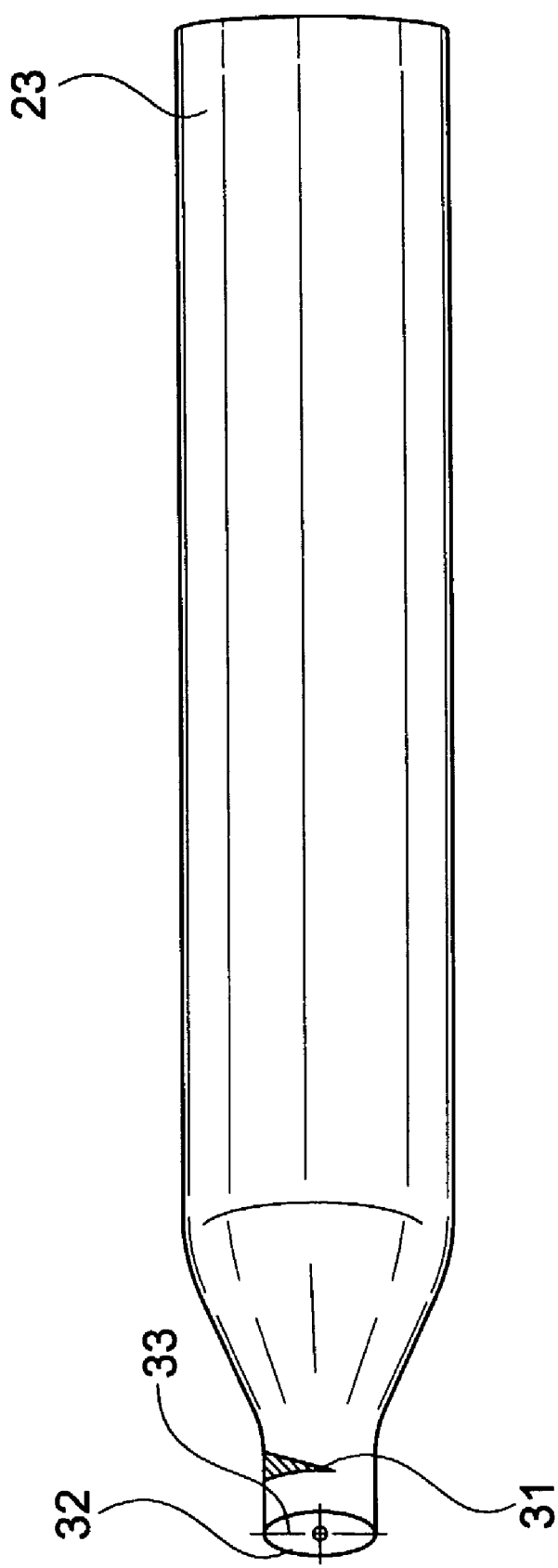
FIG. 3 is a view of the food packet of the present invention.

FIG. 3 is a detailed view of the food packet 23 having flow restrictor 31 and food packet cap 32. When the user places the food packet 23 into the hollow main housing 11, the bag piercer 24 pierces through the food packet cap 32. The food packet cap may be made with any means known within the art. Additionally, the food packet cap 32 may be scored at 33 so that the bag pincer 24 can more easily cut through the food packet cap 32. In an alternative embodiment, the food packet cap 32 may be constructed of a conventional self-sealing material allowing the user to remove a partially full food packet 32 from the housing 11 causing little waste.

When the user slides the movable actuator 12, causing the extruder blade 16 to compress the food packet 23, the contents of the food packet do not extrude from the food packet 23 uniformly. The flow restrictor 31 allows the contents of the food packet 23 to extrude in a uniform and consistent manner, since the opening between the restrictor and the side of the packet 23 is a consistent dimension, thus preventing the unnecessary waste of the contents of the food packet 23.

The packet 23 can be inserted into the housing 11 in any conventional manner. For example, the housing 11 can be made in parts so one of the ends can be removed and the packet inserted in the housing and then the end can be replaced. Another method would be to squeeze the packet through opening 26 before the spoon is attached. Any other conventional method may also be used.

Although the Insta-Spoon and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A feeding package comprising:
    a hollow housing adapted to receive a food packet,
    said housing having ends and sides,
    said housing having a feeding utensil secured to one of said ends,
    means communicating between said feeding utensil and an inside of said hollow housing,
    said housing having means for acting on a food packet placed in said hollow housing for transferring contents in said food packet through said means communicating between said feeding utensil and an inside of said hollow housing and onto said feeding utensil, and
    wherein said means communicating between said feeding utensil and an inside of said hollow housing is a channel, and
    wherein said channel has a piercing means at one end for piercing said food packet, and
    wherein said piercing means is directly adjacent said one of said ends of said housing and is a part of said feeding utensil.

2. The feeding package as claimed in claim 1, wherein said means for acting on a food packet is an extruder.

3. The feeding package as claimed in claim 1, wherein said slot has indicia means for indicating an amount of contents remaining in said food packet.

4. The feeding package as claimed in claim 1 in combination with a food packet, and wherein said food packet is flexible.

5. The feeding package as claimed in claim 4, wherein said food packet has a body and a cap,
    said cap has a sealed end which is punctured by a piercing means on said feeding utensil for piercing said food packet.

6. The feeding package as claimed in claim 5, wherein said sealed end has means for facilitating puncturing.

7. The feeding package as claimed in claim 6, wherein said means for facilitating puncturing is at least one score line.

8. The feeding package as claimed in claim 4, wherein said food packet has a restrictor means for controlling the amount of contents removed from said food packet.

9. The feeding package as claimed in claim 8, wherein said restrictor means is positioned closely adjacent a cap of said food packet.

10. The feeding package as claimed in claim 9, wherein said restrictor means is a projection which extends partially across said cap.

11. The feeding package as claimed in claim 1, wherein said extruder member is positioned between an inside wall of said hollow housing and an outside wall of said food packet.

12. The feeding package as claimed in claim 1, wherein said piercing means is hollow.

13. A feeding package comprising:
    a hollow housing adapted to receive a food packet,
    said housing having ends and sides,
    said housing having a feeding utensil secured to one of said ends,
    means communicating between said feeding utensil and an inside of said hollow housing,
    said housing having means for acting on a food packet placed in said hollow housing for transferring contents in said food packet through said means communicating between said feeding utensil and an inside of said hollow housing and onto said feeding utensil, and wherein said means for acting on a food packet is an extruder, and wherein said extruder has an operating member and an extruding member, and said housing has a slot extending though one side, and said extruding member is inside said hollow housing, and is connected, through said slot, with said operating member.

14. The feeding package as claimed in claim 13, wherein said extruding member engages only one side of said food packet.

15. A feeding package in combination with a food packet, wherein said combination comprises:

a hollow housing adapted to receive a food packet, said housing having ends and sides, said housing having a feeding utensil secured to one of said ends, means communicating between said feeding utensil and an inside of said hollow housing, said housing having means for acting on a food packet placed in said hollow housing for transferring contents in said food packet through said means communicating between said feeding utensil and an inside of said hollow housing and onto said feeding utensil, and wherein said food packet has a body and a cap, said cap has a sealed end which is, punctured by a piercing means on said feeding utensil for piercing said food packet, and wherein said sealed end has means for facilitating puncturing, and wherein said means for facilitating puncturing is at least one score line.

* * * * *